March 31, 1959 H. F. HOBBS 2,879,796
FLUID PRESSURE CONTROL APPARATUS FOR VARIABLE
RATIO POWER TRANSMISSION APPARATUS
Filed Aug. 5, 1953 3 Sheets-Sheet 1

Inventor
HOWARD FREDERICK HOBBS
By Young, Emery & Thompson
Attorneys

March 31, 1959  H. F. HOBBS  2,879,796
FLUID PRESSURE CONTROL APPARATUS FOR VARIABLE
RATIO POWER TRANSMISSION APPARATUS
Filed Aug. 5, 1953  3 Sheets-Sheet 3

INVENTOR
HOWARD FREDERICK HOBBS
BY
Irwin S. Thompson
ATTORNEY

United States Patent Office 2,879,796
Patented Mar. 31, 1959

2,879,796

FLUID PRESSURE CONTROL APPARATUS FOR VARIABLE RATIO POWER TRANSMISSION APPARATUS

Howard Frederick Hobbs, Leamington Spa, England, assignor to Hobbs Transmission Limited, Leamington Spa, England Application August 5, 1953, Serial No. 372,423

Claims priority, application Great Britain August 11, 1952

6 Claims. (Cl. 137—622)

This invention relates to a control apparatus for variable ratio power transmission, and its main object is to provide improved means for making changes of ratio automatically, preferably also providing some degree of manual control. The invention relates particularly, but not essentially, to variable ratio power transmission apparatus of the kind in which change in ratio is obtained by engagement of disengagement of hydraulically actuated friction elements.

According to the invention, a control apparatus comprises an hydraulic pump driven at variable speeds, a ratio changing piston valve operating in a cylinder, means whereby the different ratios are selected according to the position of the piston valve in the cylinder, one end of the piston valve being open to the delivery of said pump so that the pressure from the pump will tend to urge the piston valve in the one direction, and a number of exhaust openings leading from said cylinder and of restricted size in relation to the pump output at least one of which openings is opened and closed by movement of said piston valve, and means to urge the piston valve in the other direction.

The openings may be situated at different positions along the cylinder, and preferably so that when the piston valve is at one end, one opening only will be uncovered, and some pre-determined movement of the piston valve will uncover a second opening. Delivery of the pump will pass through the openings and when the pump is running at some pre-determined speed the whole of the fluid delivered by the pump will pass through the first opening. On increase in speed the pressure acting on the end of the piston valve will increase since the delivery will increase until it is sufficient to move the piston valve along, and uncover the second opening, in which position delivery from the pump can exhaust through both the first and second openings. Any desired number of openings or "stages" may be provided.

According to another preferred feature of the invention, the cylinder has at least one additional exhaust opening and there is provided a valve which may be moved into a position to open the additional opening, and into another position to close the additional opening, means to connect the valve to the throttle control of an internal combustion engine, or to some other manually actuated part, whereby when it is required to vary the output shaft speeds at which the ratio changing piston will move, the total area of the openings can be increased, whereby the delivery from the pump is more readily exhausted, and greater speeds will be required to produce any given pressure on the end of the piston.

Spring means may be employed to urge the piston valve in the direction against the pressure delivered by the pump, and this may be arranged to be manually varied. Alternatively, or additionally, this end of the piston valve may be connected to the delivery of a pump driven from an input part of a variable ratio power transmission apparatus. Pressure delivered by this pump may be varied in relation to speed and/or torque requirements, as is usual in the case of hydraulically actuated transmissions of the kind referred to.

If required, a further opening, or openings, may be provided, controlled by a thermostatically operated valve so as to vary the size of the opening in accordance with variations in temperature and viscosity of fluid.

The openings may be controlled by a manually operated valve whereby some of the openings may be closed, and others opened, so that the piston valve will tend to take up and remain in some position according to the position of the manually operated valve.

In order that the invention may be carried into effect, constructional forms thereof will now be described, with reference to the accompanying diagrammatic drawings, wherein.

Figure 1:
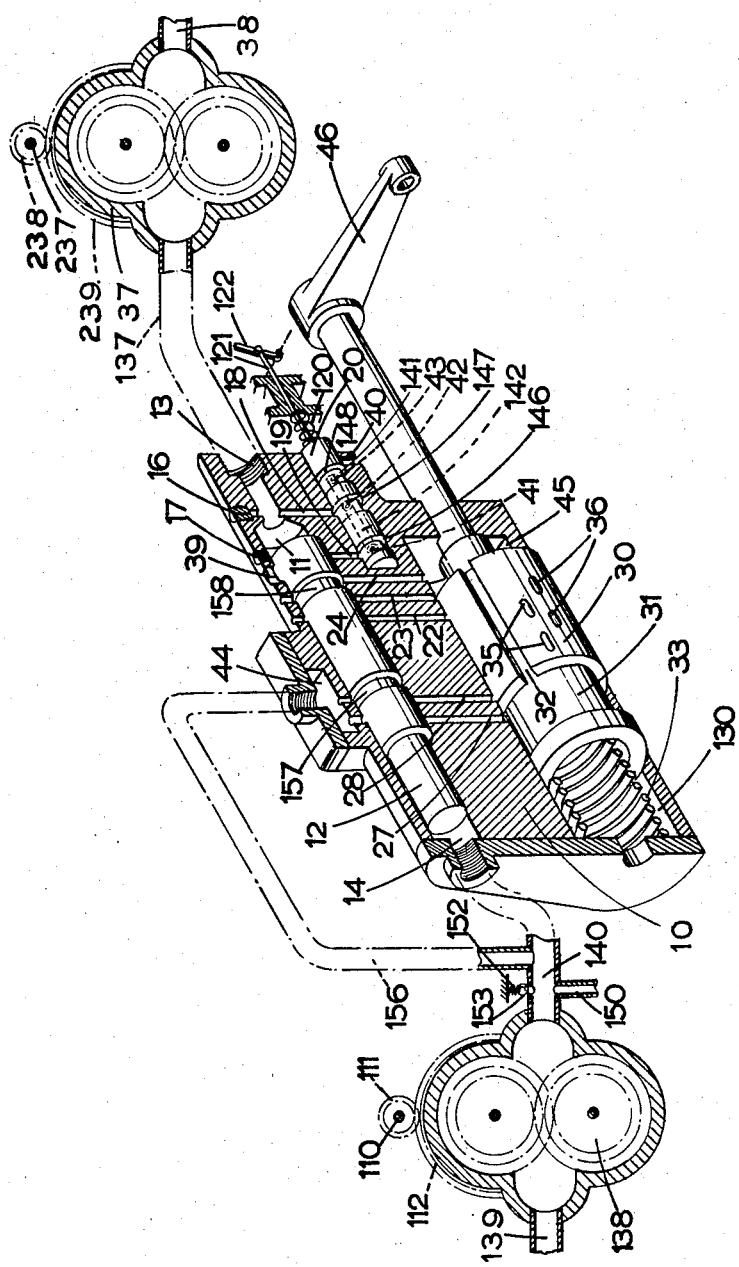
Figure 1 is a sectional view of a control apparatus made in accordance with the present invention.

Referring first to Figure 1; a housing or block 10 has a cylinder 11 containing a ratio changing piston valve 12. A pump 37 has an intake pipe 38 and a delivery pipe 137 which is connected to the housing 10 at 13, so that the fluid delivered by the pump will enter the cylinder 11. The cylinder has escape openings 16 and 17 near its inlet end spaced apart axially of the cylinder. Fluid pressure is also supplied from another pump 138 to the other end of the piston valve into the space 14, the pump 138 having an intake pipe 139 and a delivery pipe 140. The housing also has a bore 141 in which a piston valve 20 operates and is urged to the left (in the Figure) by a spring 120 and can be moved manually by means of a rod 121 which is connected to a throttle control member 122 of the engine that drives the transmission. This bore 141 is connected to the cylinder 11 by means of ducts 18, 19, and has an exhaust duct 40. The piston valve 20 has a central drilling 142 which connects radial openings 41, 42, and 43 in the valve 20 which openings lead respectively to peripheral grooves 146, 147, 148. The cylinder 11 has an elongated opening 39 spaced from openings 16, 17. The pump 37 may be driven from the output shaft 237 of the variable ratio power transmission to be driven by a pinion 238 and gearwheel 239 and the pump 138 may be driven from the input shaft 110 of said transmission by a pinion 111 and gearwheel 112. The delivery pipe 140 may be connected by pipe 150 to the clutches and/or brakes of said transmission. The transmission may be constructed as described in the specification of my United States patent application No. 376,155 filed 24th August, 1953, and now U.S. Patent No. 2,825,245, patented March 4, 1958.

In operation, should the pump 37 be stationary or running slowly, the fluid pressure acting in the space 14 will overcome the pressure, if any, in the space 11, causing the ratio changing piston valve 12 to move to the right hand end of the bore, thereby closing the opening 17. The ratio changing piston valve 12 will remain in this position so long as the fluid delivered by the pump 37 can escape through the opening 16 at lower pressure than that acting in the space 14. If the speed of the pump 37 is increased, the delivery will increase until such time as it cannot escape through the opening 16 without exceeding the pressure acting in the space 14. The piston valve 12 will then move until it uncovers the opening 17. In this position the fluid delivered by the pump 37 will escape through both of the openings 16 and 17. If the speed of the pump 37 is still further increased, the delivery will increase until it cannot escape through openings 16 and 17 without sufficient increase in pressure to again move the piston valve. Further movement of the piston valve will also uncover the opening 39. In this position the delivery from the pump 37 can escape through the openings 16, 17 and 39. Should the speed of the pump be reduced, the pressure in the cylinder will also be reduced until such time as the piston valve moves to close the opening 39. A further reduction in speed of the pump 37 will result in a reduced delivery, and a reduced pressure. If the speed is sufficiently reduced to allow the delivery to escape through openings 17 and 16 at lower pressure than acting in the space 14, the piston valve will move until its end reaches the opening 17. Similarly, a further reduction in speed in pump 37 will result in further movement of the piston valve thereby closing the opening 17. It will be understood that the cross sectional areas of the openings and the delivery from the pump 37 will be suitably selected so that the piston valve 12 will move at appropriate speeds. With a control apparatus of this kind, it is desirable that it be arranged so that normal gear changes take place at minimum speeds. It is also desirable that means be provided to increase these speeds for increased power and performance, as required. If the piston valve 20 is moved so that the opening 43 is opened to the exhaust 40, the ducts 18 and 19 are opened to the exhaust 40 through 146, 41 and 147, 42, and the total cross sectional area of the openings will be that of 16 and 42 and 17 and 41. Since the delivery from the pump 37 will escape more readily through the increased openings, the speeds of the output member of the transmission at which the ratio changing piston valve 12 will be moved will be increased.

Should the invention, therefore, be applied to a variable power transmission apparatus installed in a vehicle, and the pump 37 driven from the output shaft and the piston valve 20 connected to the accelerator pedal so as to be moved when it is depressed beyond the position giving full throttle, the ratios will be changed at some pre-determined minimum speeds of the vehicle, with throttle positions between closed and fully opened. If the operator presses the pedal beyond full throttle position, the speeds at which the ratios change will occur at some maximum pre-determined speeds. The pressure delivered by the pump 138 may be varied according to the length of a spring 152 of a relief valve 153. In this case, the speeds at which the ratio changes occur will be varied in accordance with the position of the throttle.

Various means may be adopted for controlling and causing the changes in ratio by movement of the piston valve 12.

For example as shown in Figure 1 the housing 10 carries a servo piston 30, operating in a cylinder 130. The servo piston is urged to the one end of the bore by means of a spring 33, and is moved in the opposite direction by fluid pressure. The housing has two pressure ducts 27, 28, which are supplied with fluid pressure from a space 44 in the housing, and which in turn is connected to the delivery pipe 140 by pipe 156. The housing also has three exhaust ducts 22, 23 and 24. The ratio changing piston valve 12 has two annular grooves 157, 158, one of which (157) controls the supply of pressure to the pressure ducts and the other of which controls the exhaust ducts. Should the pump 37 be stationary, or running slowly with the piston 12 at the extreme end of the bore, the ducts 27, 28 will be closed from pressure, and the exhaust duct 24 will be connected through the annular groove 158 to the exhaust 39. In this case, there will be no pressure in the space 45, and the spring 33 will move the servo piston 30 to the end of its cylinder. The servo piston 30 will be connected to a ratio changing device, as for example by a rod such as 47 shown in Figure 2. Assuming that both the servo piston valve and the ratio changing piston are at the ends of their respective bores, and the speed of the pump 37 is increased until such time as the ratio changing piston valve 12 moves to uncover the opening 17, the exhaust duct 24 will be closed since the annular groove 158 will pass beyond it and the pressure opened to 28 through the annular groove 157. In this position of the servo piston, the duct 28 will be opened to the annular space 31 and groove 32. Pressure will therefore enter the space 45 (through the duct 28, space 31, and groove 32) causing the piston valve to move and compress the spring 33 until it reaches the position shown in Figure 1. In this position, the exhaust 23 is just closed by the servo piston, and similarly the pressure channel 28. The position will thus be stabilised and if the servo piston should move one way, the exhaust 23 will be opened and pressure in the space 45 reduced, and should it move the other way, thereby opening the pressure duct 28, the pressure in the space 45 will be increased. Should the ratio changing piston valve 12 move further, i.e. to the position in which it uncovers the opening 39, then pressure will be supplied to the duct 27, and the exhaust duct 23 will be closed. This will open the pressure to the space 45, causing the piston valve to move and compress the spring still further until the annular space 31 moves beyond the pressure duct 27 thereby causing this to be closed. Movement of the ratio changing piston valve 12 in the other direction, i.e. to the position in which the opening 17 is just uncovered, will open the exhaust 23 so that the spring 33 will move the servo piston until it reaches a position where it closes the exhaust 23. Similarly, movement of the ratio changing piston valve 12 to the end of the bore causes the exhaust duct 24 to be opened, thereby allowing the spring 33 to move the piston valve to the end of its travel.

A control of this kind may be adapted to a variable ratio power transmission providing a greater number of ratios than will be selected automatically by the control, e.g. the transmission may provide a reverse and four speeds forward, and the control may be adapted to automatically select the 2nd, 3rd and 4th speeds. As illustrated in Figure 1 the servo piston valve may be rotated by means of a lever 46. In this case, with the lever 46 in one position, the rod 37 can be moved to select 1st, 2nd and 3rd ratios and with the lever 46 in another position the rod 47 may control 2nd, 3rd and 4th ratios. By movement of lever 46 into a further position reverse may be provided.

Figure 2:
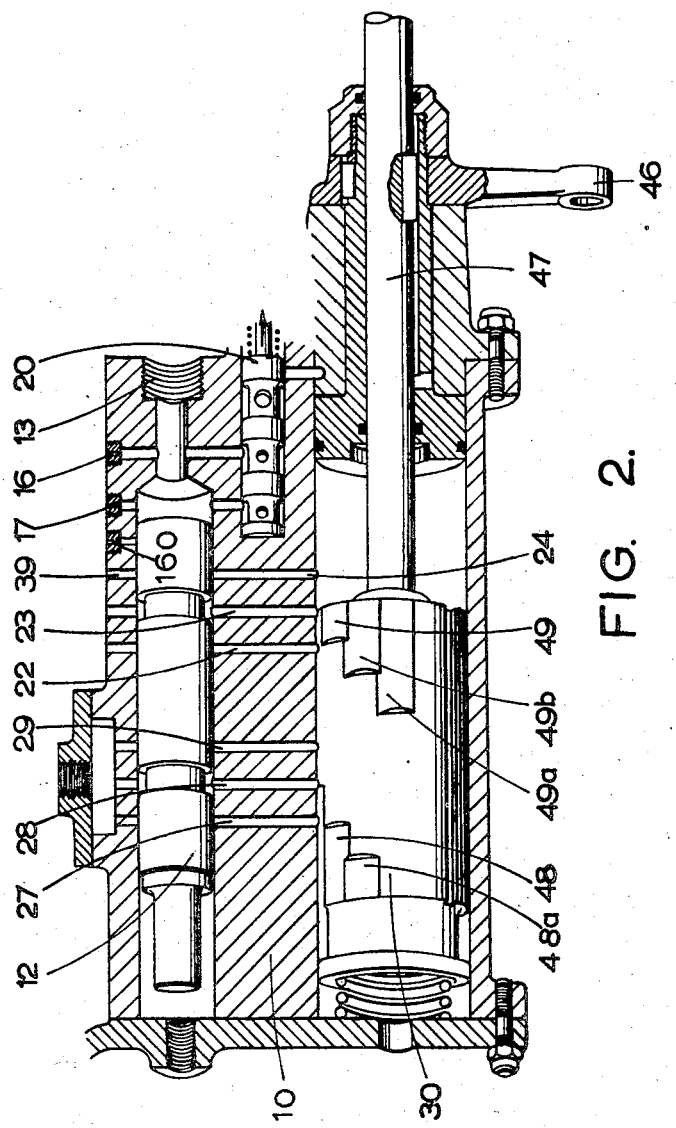
Figure 2 shows an alternative construction of the control apparatus.

If desired, the servo piston may be movable at will into different rotary positions thereby causing it to be moved hydraulically into different axial positions for effecting the ratio changes. Thus as shown in Figure 2, a rod 47 is connected to the ratio selecting part, the servo piston 30 is shaped as shown at 48, 48a, 49, 49a and 49b, and by selecting the lever 46 in different positions, the servo piston will be caused to operate through a different range of positions, since the exhaust ducts 22, 23 and 24 and the pressure ducts 27, 28, 19, will be covered and uncovered in different positions of the rod 47. For example: if the lever 46 is rotated so as to bring the part 49a in line with the exhaust ducts, the rod 47 will move to the extreme left since the exhaust duct 24 will be uncovered. This may provide reverse. If the lever 46 is rotated to bring the part 49b in line with the exhaust ducts, the rod 47 will move to the left until it takes up a position where the exhaust duct 24 is just uncovered. This may provide neutral. Further rotation of the lever 46 to a third position will result in the automatic control moving the rod 47 axially through the range giving 1st, 2nd and 3rd ratios, and still further movement of the lever 46 to a fourth position will result in the automatic control moving the rod axially through the range giving 2nd, 3rd and 4th ratios.

In Figure 2 an additional exhaust hole 160 is shown which is uncovered when the piston valve 12 moves fully to the left and serves the same purpose as the elongated port 39, Figure 1.

Figure 3:
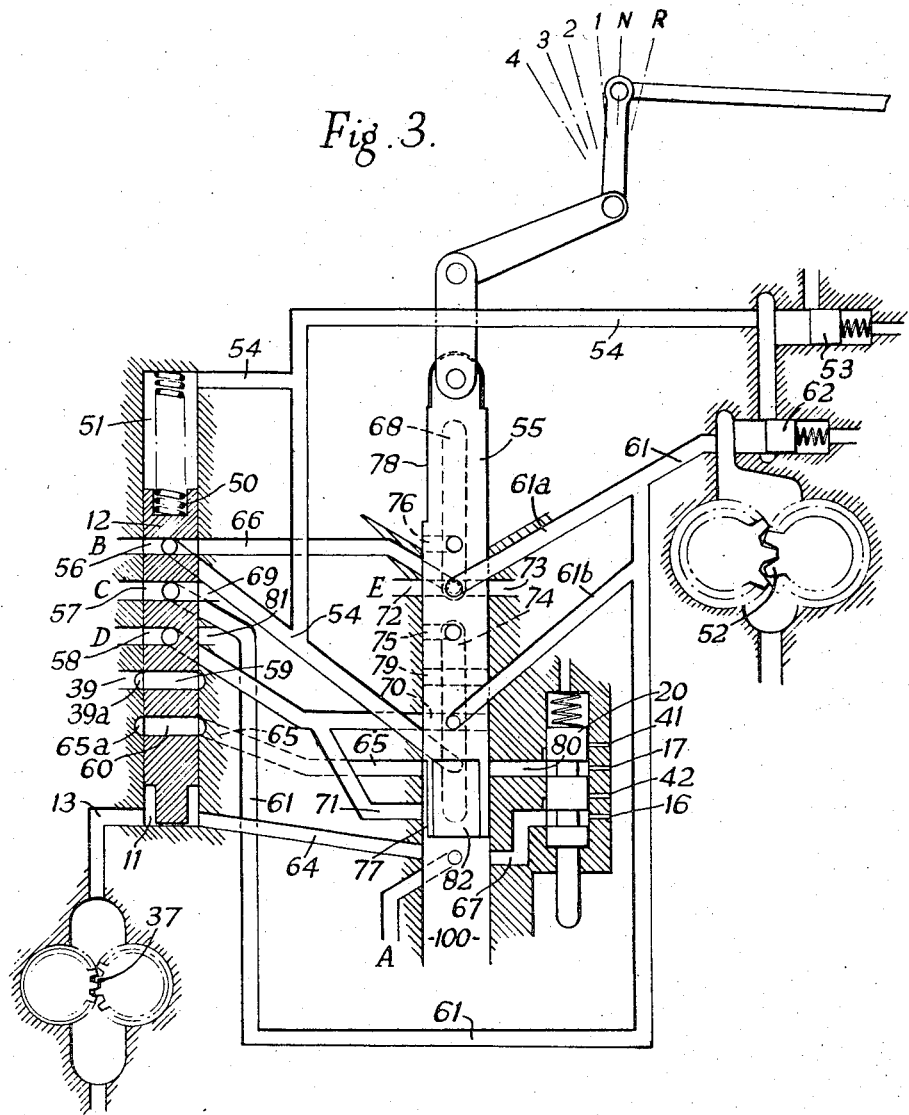
Figure 3 shows an alternative form of control, made in accordance with the invention.

Referring now to Figure 3; the ratio changing piston valve 12 is urged in one direction by a spring 50 and by fluid pressure acting in the space 51, delivered by a pump 52, controlled by a relief valve 53, and led to the space by pipe 54. Fluid delivered by the pump 37 enters the space 11 through the duct 13.

In this construction of the invention, the ratio changing piston valve 12 carries a number of ports to direct pressure to various parts of the variable speed transmission in which it is incorporated. The transmission may comprise a gear train, some parts of which are driven and some parts of which are held stationary as described in applicant's said Patent. For this purpose there are two input clutches, and three reaction brakes. These will be referred to as A and B clutches and C, D and E brakes. The ratios will be provided as follows:

| | |
|---|---|
| Reverse | Clutch B—brake E. |
| 1st | Clutch A—brake E. |
| 2nd | Clutch A—brake D. |
| 3rd | Clutch A—brake C. |
| 4th—direct | Clutches A and B. |

The control apparatus described in Figure 3 provides automatic selection of second, third and fourth ratios, and also manual selection of reverse, neutral, first, second, third and automatic. The piston valve 20 can be operated manually, so as to vary the speeds at which the ratio changing piston valve 12 operates. Piston valve 12 has ducts 56, 57, 58, 59 and 60, and the body in which it is carried has ducts B—leading to B clutch, C—leading to C brake, D—leading to D brake, 54—leading from the pump 52, the pressure in which is controlled by the clutch circuit relief valves 53, and 61 also leading from the pump 52, and controlled by the brake circuit relief valve 62. The pump 52 delivers first to the duct 61, pressure in which is maintained by the valve 62. The pump will maintain the pressure in duct 61 according to the setting of the relief valve 62. Liquid delivered by the pump passing relief 62 enters duct 54 and pressure in this duct is maintained by the valve 53, and will normally be set to maintain a lower pressure than that maintained by 62. Liquid delivered by piston valve 53 will escape to exhaust or to the lubricating system of the transmission. Valves 62 and 53 may be arranged in known manner so as to provide different operating pressures for different ratios, i.e. the pressure may be no greater than provided by the relief valve 53 for 3rd gear ratios, but may be substantially higher for reverse, and first ratio operation. Ducts 63, 71 (leading from 63), 64, 65 and 66 lead to the bore in which the selector valve 55 operates. Various other ducts lead from the selector valve bore, 61a, 61b connecting duct 61. The ducts 67, 80 lead from the selector valve bore to the bore of the piston valve 20. The selector valve 55 has ducts 70, 72, 75, 76 and 79 which comprise ducts adapted to mate with the ducts which lead to its bore. The valve 55 also has grooves 74 and 68 adapted to open to ducts leading from the bore, and flats 77, 82 and 78 which serve as exhausts and are adapted to extend beyond the ends of the bore in which valve 55 operates, and also mate with ducts leading to the bore. In addition to the various delivery ducts, the bore has exhaust ducts 73, and duct A, which leads to A clutch in the transmission, and duct E which leads to E brake in the transmission. The selector valve 55 is adapted to move upwards beyond some of the ducts leading to the bore, so as to open these to exhaust, in which case the liquid can escape through the end of the bore 100. The groove 68 is also adapted to move beyond the upper end of the bore, so as to open the duct 66 to exhaust.

The device operates as follows:

The selector valve 55 shown in the neutral position, and the clutches and brakes of the transmission, will all be open to exhaust. For example—the B clutch is open through the duct 56, and 66 to the groove 68, which extends beyond the bore in this position, and so provides an exhaust. The C brake is open to exhaust through the duct 57 and an exhaust 69, and D brake through the ducts 58, 63, 71 and space formed by the flat 82. The A clutch is controlled by the selector valve 55, and in the position shown opens to exhaust. The valve 55 is positioned beyond the A clutch duct so that it can exhaust through the end of the bore 100. The E brake is also controlled by the selector valve 55 and is opened to exhaust through ducts 72 and exhaust 73.

To obtain reverse, the selector valve is moved by hand one stage upwards, in which case the groove 74 opens to the duct 66, thereby connecting duct 54 and 66, which leads via 56 to B clutch. Pressure delivered by pump 52 to duct 54 is therefore led to the B clutch, causing it to be engaged. For operation in reverse, it is also required to engage the E brake. This is connected to the duct 61 at the point 61a by means of the duct 75.

For operating in 1st ratio, the selector valve 55 is moved by hand two stages downwards in which position the duct 76 connects 61a to E brake. The pressure in the duct 61 is therefore led to the E brake causing it to be engaged. The B clutch is opened to exhaust through 56, 66 and 68. The A clutch duct now aligns with the groove 74, and is connected to the pump 52 by means of duct 54.

During operation in 1st ratio, the pump 37 is driven from the output shaft of the variable ratio transmission. The fluid entering the space 11 via duct 13 can however exhaust through duct 64 since, with the selector valve in 1st gear position, the flat 77 aligns with 64 allowing the fluid to exhaust beyond the end of the valve and from the bore 100. The ratio changing piston valve 12 will therefore be held in the position shown by fluid pressure and the spring 50 which act on the other end.

To obtain second ratio, the valve 55 is moved a further stage downwards, in which position the A clutch remains engaged as this will open to the duct 54 through the groove 74. The E brake is disengaged since the flat 78 on the valve 55 aligns with this duct, and allows exhaust beyond the upper end of the valve, and the D brake is engaged as it is connected to the pump 52, through 58, 63, 75, 61b and 61. The pressure in this duct is controlled by the brake relief valve 62. The flat 77 still aligns with the duct 64 and so allows the fluid delivered by the pump 37 to escape.

3rd ratio is obtained by moving the selector valve 55 a further stage downwards. In this position A clutch is still engaged, since it remains open through the groove 74 to the duct 54. Flat 77 is now moved beyond the duct 64 causing it to be closed. The fluid delivered by the pump 37 to the space 11 cannot escape, and the ratio changing piston valve 12 moves upwards until it uncovers the annular groove 65a, which joins the duct 65 to the space 11. In this position of the ratio changing piston valve the duct to C brake is connected by the duct 58 to the duct 61, and pressure delivered by the pump 52 is therefore fed to the brake, causing it to be engaged. The delivery from the pump 37 passes through the annular groove 65a and duct 65, and a duct 79 in the valve 55 to the duct 61. The purpose of this is to enable, for example, a vehicle to be towed and the engine started, in which case the pump 52 would be stationary and it is necessary that the delivery of the pump 37 be led to the ducts 61, 54, so as to engage the appropriate clutch and brake, to enable the engine to be driven by means of rotation of the output shaft.

To obtain automatic operation, the valve 55 is moved another stage downwards to its extreme position. When in this position, the duct 65 is connected to a duct 80 by means of the duct 75, and the duct 64 is connected to the duct 67 by the duct 70. It will be seen that selected in this position the pump 37 connects the space 11, which is connected via 64 and 67, to the opening 16, and the duct 65 connects via 80 to the opening 17. The cross-sectional area of the openings can be increased by movement of the valve 20, when openings 41, 42 come into operation. The ratio changing piston valve 12 will therefore operate as described above, i.e. when fluid delivered by the pump 37 cannot escape through the openings 16, the piston will move upwards until it uncovers the duct 65, when both openings 16 and 17 will be in operation. If the fluid delivered by the pump cannot escape through the openings 16, 17, the ratio changing piston valve 12 will move further until it opens the annular groove 39a, and exhaust 39. To increase speeds, the piston valve 20 is moved to bring the openings 41, 42 into operation. The ratios in the transmission are changed as follows: A clutch remains engaged, since the duct 54 remains open through the A clutch duct, through groove 74. For second ratio operation, it is also required to engage the D brake. This is open to pressure via ducts 58, 63, 76, 61b and 61. The ratio changing piston 12 will move upwards when the change from 2nd to 3rd is to be made. Having moved to its 3rd ratio position, the C brake will be engaged and fed with fluid pressure through 58 and 61. D brake will be exhausted through 59 and exhaust 81. Further movement of ratio changing piston valve 12 causes B clutch to be engaged via 58, 54, C brake is exhausted through 59, 69, and D brake is exhausted through 60, 81.

Should the selector valve be moved at any time to another position, neutral or a fixed ratio will be provided, as above described, for example: on movement to 3rd ratio position, the duct 65 will be open to the duct 61. Pressure in the duct 61 will be the same as in the duct 54 (for 3rd ratio), and hence pressure in the space 51 and 11 will be equal, and should the piston 12 be in the outermost position, it will be moved to the 3rd gear position by means of the spring 50. If 2nd gear position is selected by the valve 55, the duct 64 will be open to exhaust and there will be no pressure in the space 11, hence the piston valve 12 will move to the position shown in Figure 3 (for 2nd ratio).

It will be understood that the invention may be carried into effect in various ways. The ratio changing piston valve 12 can for example be provided with a number of electrical contacts, thereby controlling electrically a mechanism providing change in ratio.

I claim:

1. A control apparatus for a variable ratio power transmission gearing comprising housing means having a bore, a ratio changing piston valve in said bore, a source of fluid pressure, a communication between the source of fluid pressure and a space in said bore between one end of the bore and the said piston valve to urge the piston valve in one direction, means for urging the piston valve resiliently in the other direction, at least three exhaust ports in said bore, the first of said exhaust ports being permanently in communication with said space, the second and third exhaust ports being spaced from each other axially along the bore in positions in which they can be uncovered by said piston valve, exhaust area control means movable at will for controlling the effective exhaust areas from said first and second exhaust ports, and movable valve means movable at will independently of the movement of said control means, communications between said first and second exhaust ports and said movable valve means, said valve means having porting for closing said first and second exhaust ports alternatively at will in order to determine the position of said piston valve, and for closing and opening communication between said first and second exhaust ports and said control means.

2. A control apparatus for a power transmission gearing comprising housing means having two bores, a ratio changing piston valve in the first bore, a selection piston in the second bore, a source of fluid pressure, a communication between the source of fluid pressure and a space in the first bore between one end of said bore and the ratio changing piston valve to urge said piston valve in one direction, means for urging the ratio changing piston valve resiliently in the other direction, at least three exhaust ports in said first bore, the first of said exhaust ports being permanently in communication with said space, the second and third said exhaust ports being spaced from each other axially along the bore in positions in which they can be uncovered by said ratio changing piston valve, at least three exhaust ports, in the second bore at least two of which are coverable by the selector piston, at least two inlet ports in said second bore spaced apart from each other axially along said bore, means connecting the first and second exhaust ports of the first bore with the inlet ports of the second bore, the third exhaust port of the first bore being permanently open to exhaust, and means for varying the effective cross sectional area of exhaust from the exhaust ports of the second bore; said selector piston having shapes whereby over different ranges of its travel it (1) connects the first inlet port of the second bore to an exhaust port of the second bore, (2) it closes said first inlet port and connects another inlet port in the second bore to exhaust, and (3) connects the inlet ports of the second bore to said means for varying the effective cross-sectional area thereof.

3. A control apparatus for a power transmission gearing comprising housing means having three bores, a ratio changing piston valve, selector piston, an exhaust control piston disposed respectively in said bores, a source of fluid pressure, a communication between the source of fluid pressure and a space in the first bore between one end of said bore and the ratio changing piston valve to urge said piston valve in one direction, means for urging the ratio changing piston valve resiliently in the other direction, at least three exhaust ports in said first bore, the first of said exhaust ports being permanently in communication with said space, the second and third said exhaust ports being spaced from each other axially along the bore in positions in which they can be uncovered by said ratio changing piston valve, at least three exhaust ports in the second bore, at least two of which are coverable by the selector piston, at least two inlet ports in said second bore spaced apart from each other axially along said bore, said third bore having at least two inlet ports spaced apart from each other axially along the bore, and at least two groups of exhaust ports also spaced apart from each other axially along the bore, said groups being associated respectively with said inlet ports; means connecting the first and second exhaust ports of the first bore with the inlet ports of the second bore, the third exhaust port of the first bore being permanently open to exhaust, and means connecting the exhaust ports of the second bore with the inlet ports of the third bore, said selector piston having length and ducts whereby over different ranges of its travel it (1) connects the first inlet port of the second bore to an exhaust port of the second bore, (2) it closes said first inlet port and connects another inlet port in the second bore to exhaust and (3) connects the inlet ports of the second bore to said inlet ports of said third bore; said exhaust control piston having ducting therein for connecting the inlet ports of the third bore respectively to the groups of exhaust ports with different ports of each group in communication with the inlet ports in different positions of the exhaust control piston.

4. A control apparatus for a variable ratio power transmission gearing comprising housing means having a bore, a ratio changing piston valve in said bore, a source of fluid pressure, a pump driven by said gearing, a communication between a source of fluid pressure and a space in said bore between one end of the bore and the said piston valve to urge the piston valve in one direction, means for urging the piston valve resiliently in the other direction, at least three exhaust ports in said bore, the first said exhaust ports being permanently in communication with said space, the second and third exhaust ports being spaced from each other axially along the bore in positions in which they can be uncovered by said piston valve, exhaust area control means movable at will for controlling the effective exhaust areas from said first and second exhaust ports, and movable valve means movable at will independently of the movement of said control means, communications between said first and second exhaust ports and said movable valve means, said valve means having porting for further varying the said first effective exhaust areas of said first and second exhaust ports alternatively at will in order to determine the position of said piston valve.

5. A control apparatus for a variable ratio power transmission gearing comprising housing means having a bore, a ratio changing piston valve in said bore, a source of fluid pressure, a communication between the source of fluid pressure and a space in said bore between one end of the bore and the said piston valve to urge the piston valve in one direction, means for urging the piston valve resiliently in the other direction, at least three exhaust ports in said bore, the first of said exhaust ports being permanently in communication with said space, the second and third exhaust ports being spaced from each other axially along the bore in positions in which they can be uncovered by said piston valve, and exhaust control means movable at will for controlling the exhaust from said first and second exhaust ports, a second bore, a selector piston in the second bore, a second source of fluid pressure having outputs and conduits providing communication between said second source and the first and second bores, ducting between said first and second bores, and ducts leading from the first and second bores for connection to the outputs of the second source of fluid pressure, communication between said ducting and ducts being open and closed by the ratio changing piston valve and the selector piston.

6. A control apparatus for a variable ratio power transmission gearing comprising housing means having a bore, a ratio changing piston valve in said bore, a source of fluid pressure, a communication between the source of fluid pressure and a space in said bore between on end of the bore and the said piston valve to urge the piston valve in one direction, means for urging the piston valve resiliently in the other direction, at least three exhaust ports in said bore, the first of said exhaust ports being permanently in communication with said space, the second and third exhaust ports being spaced from each other axially along the bore in positions in which they can be uncovered by said piston valve, and exhaust control means movable at will for controlling the exhaust from said first and second exhaust ports, a second bore, a selector piston in the second bore, a second source of fluid pressure having outputs and conduits providing communication between said second source and the first and second bores, ducting between said first and second bores and leading from the first and second bores for connection to the outputs of the second bores for connection to the outputs of the second source of fluid pressure, and a duct in the selector piston which in a suitable position of said piston effects communication between said conduits and said ducting.

References Cited in the file of this patent

UNITED STATES PATENTS

| | | |
|---|---|---|
| 1,004,541 | Martin | Sept. 26, 1911 |
| 1,047,146 | Balloco | Dec. 17, 1912 |
| 1,818,910 | Sanine | Aug. 11, 1931 |
| 2,102,781 | Bieretz | Dec. 21, 1937 |
| 2,204,872 | Thompson | June 18, 1940 |
| 2,223,716 | Bojesen | Dec. 3, 1940 |
| 2,323,601 | Hobbs | July 6, 1943 |
| 2,352,212 | Lang | June 27, 1944 |
| 2,416,154 | Chilton | Feb. 18, 1947 |
| 2,633,035 | Livermore | Mar. 31, 1953 |
| 2,738,772 | Richter | Mar. 20, 1956 |
| 2,774,192 | Grobey | Dec. 18, 1956 |